US010919479B2

(12) United States Patent
Dorn et al.

(10) Patent No.: US 10,919,479 B2
(45) Date of Patent: Feb. 16, 2021

(54) METHOD FOR PRODUCING A DECORATIVE COMPOSITE HAVING AT LEAST ONE LOCAL WEAKENING AND A WEAKENED SPACER FABRIC

(71) Applicant: Eissmann Automotive Deutschland GmbH, Bad Urach (DE)

(72) Inventors: Felix Dorn, Pfullingen (DE); Jennifer Topp, Pfullingen (DE); Karlheinz Kaeppeler, Muensingen (DE)

(73) Assignee: EISSMANN AUTOMOTIVE DEUTSCHLAND GMBH, Bad Urach (DE)

( * ) Notice: Subject to any disclaimer, the term of this patent is extended or adjusted under 35 U.S.C. 154(b) by 0 days.

(21) Appl. No.: 15/212,610

(22) Filed: Jul. 18, 2016

(65) Prior Publication Data
US 2017/0015268 A1 Jan. 19, 2017

(30) Foreign Application Priority Data
Jul. 16, 2015 (DE) .................. 10 2015 111 590

(51) Int. Cl.
*B23K 26/53* (2014.01)
*B29C 59/00* (2006.01)
(Continued)

(52) U.S. Cl.
CPC .......... *B60R 21/2165* (2013.01); *B23K 26/53* (2015.10); *B29C 59/007* (2013.01);
(Continued)

(58) Field of Classification Search
CPC .......... B60R 21/2165; B60R 21/21654; B23K 26/0057; B29C 59/007
See application file for complete search history.

(56) References Cited

U.S. PATENT DOCUMENTS 5,589,245 A * 12/1996 Roell .................. D03D 27/10
428/85
6,254,122 B1 * 7/2001 Wu .................. B29C 59/007
280/728.3
(Continued)

FOREIGN PATENT DOCUMENTS

DE 69906703 T2 1/2004
DE 10352581 A1 6/2005
(Continued)

OTHER PUBLICATIONS https://de.wikipedia.org/wiki/Abstandsgewirke (2019).

*Primary Examiner* — Michael P Wieczorek
(74) *Attorney, Agent, or Firm* — Kriegsman & Kriegsman

(57) ABSTRACT

Method for producing a weakened decorative composite from at least one decorative material (25) and a spacer fabric (11), in particular for producing coverings of airbags in motor vehicles, which spacer fabrics (11) have an upper cover layer (12) and a lower cover layer (13) and a layer (15) having spacer threads (14) is located between the cover layers (12, 13), wherein the weakenings in the spacer fabric (11) are blind holes (16) which are introduced into the lower cover layer (13) of the spacer fabric (11), wherein the blind holes (16) substantially pass through the lower cover layer (13) and the layer (15) having the spacer threads (14) and the upper cover layer (12) is substantially not weakened.

18 Claims, 3 Drawing Sheets

Figure 1:
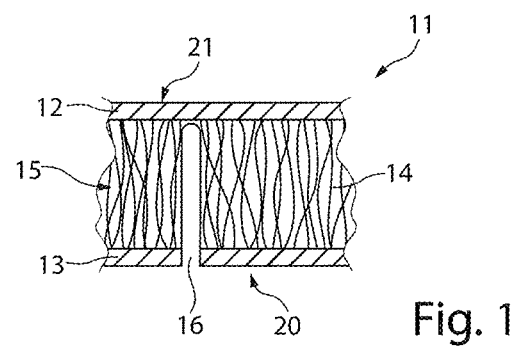

(51) Int. Cl.
   *B60R 21/2165*   (2011.01)
   *B60R 21/00*   (2006.01)
(52) U.S. Cl.
   CPC .......... *B29C 2791/009* (2013.01); *B60R 2021/21654* (2013.01)

(56) References Cited

U.S. PATENT DOCUMENTS

| | | | | |
|---|---|---|---|---|
| 7,497,463 | B2* | 3/2009 | Kaulbersch | B26F 1/24 280/728.3 |
| 7,989,052 | B2* | 8/2011 | Hehn | B32B 3/02 428/190 |
| 2004/0195814 | A1* | 10/2004 | Muller | B60R 21/2165 280/743.1 |
| 2014/0186567 | A1* | 7/2014 | Walter | B60R 21/2165 428/43 |

FOREIGN PATENT DOCUMENTS

| | | |
|---|---|---|
| DE | 102004014942 A1 | 10/2005 |
| DE | 10331121 B4 | 7/2006 |
| DE | 102005012720 A1 | 9/2006 |
| DE | 102006027082 A1 | 12/2007 |
| DE | 102006054586 B3 | 1/2008 |
| DE | 102006054590 B3 | 1/2008 |
| DE | 102006055861 B3 | 2/2008 |
| DE | 102006054587 A1 | 6/2008 |
| DE | 102007017602 A1 | 10/2008 |
| DE | 102009008726 A1 | 10/2009 |
| DE | 102009043498 A1 | 4/2011 |
| DE | 102009048893 A1 | 4/2011 |
| DE | 102010062606 A1 | 6/2012 |
| DE | 102013021393 A1 | 7/2014 |
| DE | 10231131 B4 | 8/2014 |
| DE | 102014006070 A1 | 11/2014 |
| DE | 102015104715 A1 | 9/2016 |
| EP | 0617152 B1 | 9/1994 |
| EP | 0617152 B1 | 8/1999 |
| EP | 1623883 A1 | 2/2006 |
| EP | 1750978 B1 | 1/2008 |
| JP | 2014113883 A | 6/2014 |

* cited by examiner

METHOD FOR PRODUCING A DECORATIVE COMPOSITE HAVING AT LEAST ONE LOCAL WEAKENING AND A WEAKENED SPACER FABRIC

The present invention relates to a method for producing a decorative composite having at least one local weakening, wherein the decorative composite comprises at least one decorative cover and a spacer fabric. Such a decorative composite can, in particular in motor vehicles, be used as an airbag covering.

The invention also relates to a method for weakening spacer fabrics.

Nowadays, airbags are integrated into motor vehicles at different positions, for example in steering wheels, dashboards, doors, etc. For reliable functioning of the airbag, it is necessary that the plastic carrier has one or more material weakenings, so-called predetermined breaking points, in all of its layers, which define the shot channel of the airbag.

Usually, the plastic carrier of the airbag is covered with a decorative cover or decorative composite. This covering must, however, also have a material weakening in the region of the boundary of the airbag flap, such that the secure opening of the airbag flap and the unfolding of the airbag remain ensured during impact.

The opening of the cover along the material weakenings must additionally occur within a predetermined time window. An uncontrolled particle flight by flying fragments of the cover must also in any case be prevented.

Such decorative covers are known to be made from different materials, for example from plastic films, cover materials, textiles, slush, artificial leather or leather. Even with enhanced vehicle designs, the covers are produced more and more frequently from leather. Leather has no homogeneous material properties and has, in its developed, three-dimensional fibre structure, extraordinarily high strength, which, in the case of leather, makes particularly high material weakening necessary in order to enable an unfolding of the airbag which is not unimpeded in any way.

These functional requirements with simultaneous compliance with the design requirements of the non-visibility of the material weakening represent a great technical challenge which is classified, specifically for the material leather, as technically very demanding.

It has already been proposed to introduce perforations into the leather of a length of less than 0.8 mm in a line at a distance to one another, as described in EP 1 750 987 B1. Additionally, it is known to perforate weakening lines, in particular also in decorative covers, by means of lasers. For the targeted weakening of leather by means of UV laser radiation, micro holes are introduced into the material. These are generally arranged along a course and thereby form a defined weakening line. The radiation occurs on the rear side, the so-called flesh side of the leather, such that the front or upper side of the leather is only minimally damaged by the laser radiation.

Frequently, at least one haptics layer is provided between the plastic carrier and the decorative cover which has greater softness and contributes to a haptically pleasing appearance.

In particular, so-called spacer fabrics are used as haptic layers.

The structure as well as the materials of such spacer fabrics are known to the person skilled in the art and, for example, are described in EP 0617152 B1. This specification also teaches the production and use of such spacer fabrics.

Usually, the introduction of weakenings into spacer fabrics occurs by the spacer fabric being weakened continuously by punching. In a subsequent step, this weakened spacer fabric is then applied to a dimensionally stable carrier and then a preferably also weakened decorative material is laminated onto this partial composite of carrier and spacer fabric. This lamination sequence of the material structure is selected in particular for particularly complex seam contours, wherein faultless positioning of the seams with respect to the lamination dips or lamination edges is required.

Because of the continuous weakening of the spacer fabric, the support material is, however, weakened, above all in the region of the spacer threads which are arranged between the cover layers, so much that a visible imprint on the decorative cover can occur.

In DE 10 2014 006 070 A1 the spacer fabric and the decorative cover is not weakened. An opening element, which projects toward the airbag, is positioned to a weakening of a lower cover layer in such a way that the opening element breaks up the cover layer at the weakening during triggering of the airbag.

However, it is elaborate and expensive to implement such an opening element.

In order to prevent the weakening of the spacer fabric from being imprinted on the decorative cover, in DE 10 2006 054 590 B3 it is proposed to form the weakenings by blind holes introduced into the two cover layers of the spacer fabric, wherein the blind holes are aligned preferably perpendicularly to one another and the spacer threads are not or only minimally weakened. The production occurs generally in such a way that, in the first work step, the spacer fabric is laminated onto the carrier, and then the blind holes are introduced into the partial composite on the rear side through the carrier and the one cover layer of the spacer fabric and onto the front side through the other cover layer of the spacer fabric with the aid of a milling tool.

It is also proposed to firstly introduce the blind holes into the two cover layers of the spacer fabric and to then laminate the weakened spacer fabric onto the carrier.

This method is, however, costly, since a two-fold weakening and a turning must occur, which also lengthens the process time. Additionally, the risk of entry of adhesive into the spacer fibres exists, which can lead to a hardening of regions of the spacer fabric.

The object of the invention consists in specifying a method for producing a weakened decorative composite having a spacer fabric and a method for producing a weakened spacer fabric which is less costly and with which, nevertheless, the introduced weakenings are substantially invisible.

This object is solved by the features of claims 1 and 2.

According to the invention, the weakening of the spacer fabric occurs by the weakenings being blind holes which are introduced into a cover layer of the spacer fabric, wherein the blind holes substantially pass through the one cover layer and the layer having the spacer fabric and the second cover layer is substantially not weakened.

Since blind holes are introduced into the spacer fabric from only one side, the process time can be shortened and the turning required according to prior art can be omitted.

Due to the fact that the second cover layer, onto which the decorative material is then laminated, is not weakened, the penetration of adhesive into the spacer fabric is lower than with the previously known methods. Additionally, higher extraction forces between spacer fabric and decorative material are achieved than with the method known from prior art, since the second cover layer remains unweakened and can be adhered completely.

Additionally, the weakening of the spacer fabric according to the invention causes a defined tearing of the spacer fabric and therefore an improvement of the entire airbag system.

Blind holes are understood, in the scope of the present invention, to be any hole introduced into the spacer fabric which is not a passage hole and does not go through the second cover layer.

Since spacer fabrics are not homogeneous materials and the spacer threads can also have nodes, etc. and the blind holes are generally introduced into the spacer fabric using a laser, blind holes can then also be present if almost all introduced holes are blind holes, even if, as a consequence of the inhomogeneity of the material with respect to a very small portion, the laser can perhaps pass through the material once at one point or the other. In this way, the feature "wherein the blind holes substantially pass through the one cover layer and the layer having the spacer threads and the second cover layer is substantially not weakened" is to be understood.

The blind holes can be formed to be longitudinal (slot-shaped), oval, round, rectangular, square or another shape, for example arched. Preferably, the blind holes are longitudinal in the top view, having a slot length of between 0.2 mm and 2.0 mm, preferably between 0.3 mm and 1.0 mm and particularly preferably between 0.5 mm and 0.8 mm and are arranged on a weakening line.

In order to prevent sink marks and weakenings which are visible on the decorative layer, bars which are preferably between 0.2 and 1.0 mm, preferably between 0.3 and 0.8 and particularly preferably between 0.4 and 0.6 mm long are between the blind holes arranged on a weakening line.

In a particularly preferred variant, two weakening lines run in parallel to each other with the blind holes and the blind holes or bars are arranged in gaps on the two weakening lines. Such an arrangement is advantageous because the reliability is increased that the spacer fabric tears along the weakening line.

The distance between the two weakening lines can be between 0.1 mm and 2.0 mm, preferably between 0.3 mm and 1.0 mm and particularly preferably between 0.6 mm and 0.8 mm.

The blind holes can, however, also be introduced into the spacer fabric in another arrangement, also on curved lines, zigzagged lines or even distributed statically over a narrower or a wider area or even distributed over the entire spacer fabric.

The upper side of the spacer fabric and the upper cover layer of the spacer fabric also remain unweakened after the weakening has occurred. Since the upper cover layer of the spacer fabric is therefore not damaged, an increased penetration of the adhesive or a sinking of the surface cannot occur. Penetration of the adhesive into the layer having the spacer threads leads to poorer haptics, since the spacer threads lose softness due to the adhesive.

The blind holes introduced into the rear side of the spacer fabric also, however, appear through the spacer fabric on the upper side, such that the weakening can be positioned well in the spacer fabric with regard to the weakening in the leather.

Generally, the spacer fabrics are between 1 mm and 5 mm and preferably between 1.5 and 4 mm and particularly preferably between 1.7 and 3.4 mm thick.

In a further variant of the invention, the spacer fabric has a plurality of blind holes which are introduced into the lower cover layer and pass through the layer having the spacer threads, wherein the upper cover layer is substantially unweakened, wherein complete perforations of the spacer fabric can also be provided between these blind holes in an isolated manner, in order to improve the tear behaviour in the critical region.

Spacer fabrics are distinguished compared to foam materials by a long service life. Additionally, they are very robust and easy to handle during production of trim parts, in particular for repositioning of the cover.

Spacer fabrics can be coated with hot melt, dispersion or solvent-containing adhesives.

If dispersion adhesives are used, spacer fabrics having a fluorocarbon finishing (Teflon coating) are preferably used in order to make the spacer fabric hydrophobic. The hydrophobic fluorocarbon finishing causes the adhesive penetration of the aqueous dispersion adhesive into the cover layers and into the layer having the spacer threads to be reduced and therefore the adhesive effect to be increased.

Due to the fact that the decorative material, in particular leather, is laminated onto the undamaged upper cover layer of the spacer fabric according to the invention, the blind holes located underneath the upper cover layer in the layer having the spacer threads and the lower cover layer do also not stand out on the upper side of the decorative material, such that the desired "invisibility" of the weakening is obtained.

The blind holes can be introduced into the spacer fabric in different ways, for example with mechanical means or by means of a laser or in another way.

After the blind holes have been introduced into the one cover layer of the spacer fabric, the spacer fabric can then be laminated with its other cover layer onto the desired decorative material, for example made from leather, artificial leather or sheeting.

It is also possible to firstly laminate the weakened spacer fabric onto a carrier with the weakened side and only then to laminate the decorative material onto the unweakened side of the spacer fabric.

In a further variant of the present invention, the spacer fabric is only laminated onto the leather, and only then are the blind holes introduced into the cover layer of the spacer fabric not connected to the leather.

Figure 2:
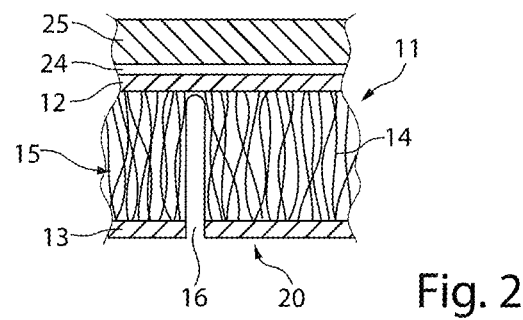
Figure 3:
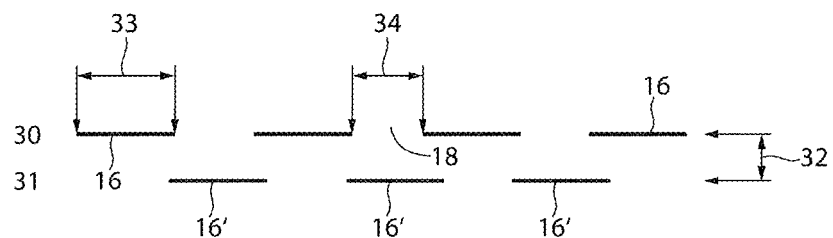
Figure 4:
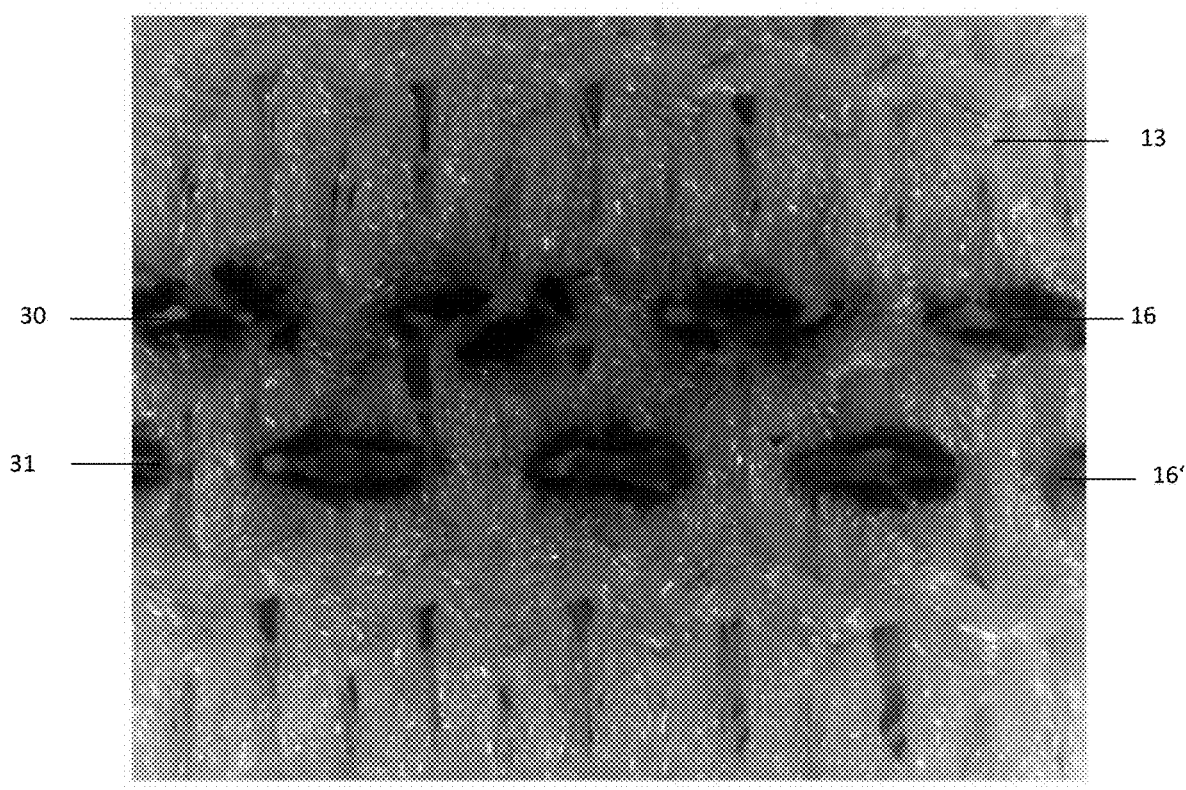
Figure 5:
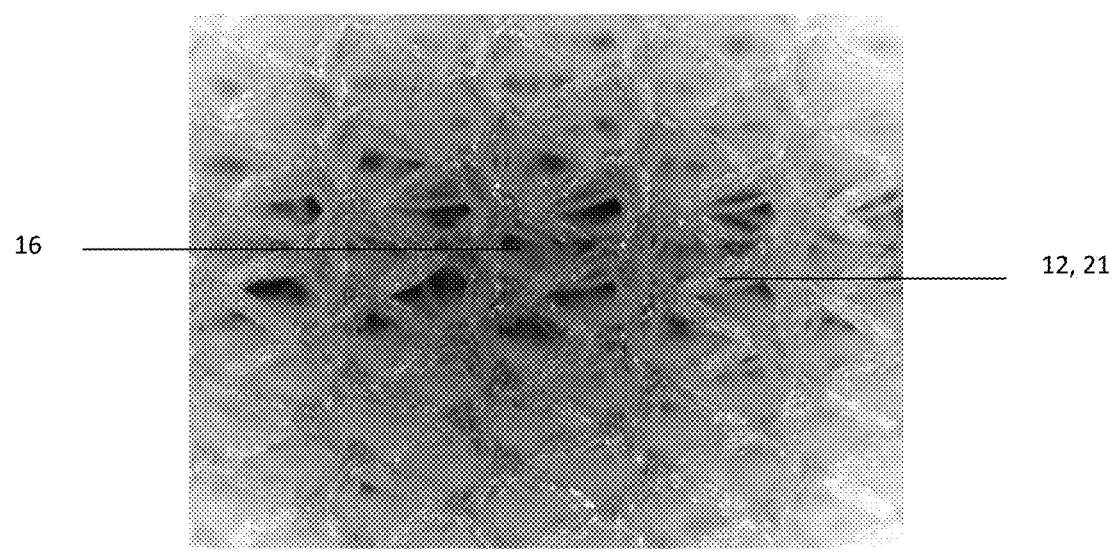

The invention as well as further advantageous embodiments and developments of the same are described and explained in more detail below by means of the examples depicted in the drawings. The features to be gleaned from the description and the drawings can be applied individually or together in any combination according to the invention. Here are shown:

FIG. 1 a cross-section through a spacer fabric having a blind hole,

FIG. 2 a decorative composite made from a decorative material and the weakened spacer fabric, FIG. 3 a schematic depiction of a preferred arrangement of the blind holes on two weakening lines, FIG. 4 a microscopic image of the rear side of the spacer fabric with a weakened lower cover layer and FIG. 5 a microscopic image of the upper side of the spacer fabric with unweakened upper cover layer, through which the weakening located underneath the upper cover layer is recognisable.

In FIG. 1, a spacer fabric 11 having an upper cover layer 12, a lower cover layer 13 and a layer 15 lying between the upper 12 and the lower 13 cover layer having spacer threads 14 is depicted schematically in cross-section. Spacer fabrics are three-dimensionally structured technical textiles which have a defined distance between the two knitted cover layers 12, 13.

The cover layers 12, 13 consist of polyester multifilaments which provide the spacer fabric with specific soft surface haptics.

The spacer threads (end threads) 14 are the binding element between the two cover layers 12, 13 and are responsible for the thickness and compressive elasticity of the 3D textile. The spacer threads 14 consist of polyester monofilaments and provide the spacer fabric 11 with the required strength.

A blind hole 16 is introduced into the spacer fabric 11, said blind hole extending on the lower side 20 of the spacer fabric 11 through the lower cover layer 13 and the layer 15 having the spacer threads 14. The upper cover layer 12 is substantially undamaged.

FIG. 2 shows the weakened spacer fabric 11 from FIG. 1 which is adhered to the decorative material 25 with its undamaged cover layer 12 by means of an adhesive layer 24. Generally, the decorative material 25 is also weakened (not depicted).

A possible arrangement of the blind holes 16 is depicted in FIG. 3. The blind holes 16 are longitudinal (slot-shaped) in the top view. Their slot length 33 is, in this preferred embodiment, 0.7 mm and their width is 0.2 mm. The blind holes 16 are arranged one behind the other on a straight weakening line 30; a bar 18, the length of which is 0.5 mm, is located between two blind holes 16 respectively.

A further straight weakening line 31 is located in parallel to the one weakening line 30 having the blind holes 16 at a distance 32 of 0.7 mm, on which weakening line 31 blind holes 16' of the length 33 of 0.7 mm are also arranged with a bar length 34 of 0.5 mm. The offset between the blind holes 16 on the first weakening line 30 and the blind holes 16' on the second weakening line 31 is 0.6 mm, such that a bar 18 is located at the height of the blind hole 16 of the one line and vice versa. Bars 18 and blind holes 16 are arranged in gaps on the two weakening lines 30, 31.

FIG. 4 shows a microscopic image of the lower side 20 of the weakened spacer fabric 11, in particular of the lower cover layer 13, into which slot-shaped longitudinal blind holes 16 are lasered. The blind holes 16 are located on two parallel weakening lines 30, 31 with an arrangement as described in FIG. 3.

The depicted spacer fabric 11 has a layer thickness of between 1 and 5 mm, the blind hole 16 passing through the lower cover layer 13 and the layer 15 having the spacer threads 14 is 0.5 to 4.5 mm, preferably approximately 4.0 mm deep, and the undamaged upper cover layer 12 is approximately 0.5 mm thick.

The front side 21 of the spacer fabric 11 after the lasering has occurred is depicted in FIG. 5. It can be recognised that the front side 21 having the upper cover layer 12 is undamaged. The darker regions underneath the upper cover layer 12, however, point to the blind hole 16 extending through the layer 15 having the spacer threads 14 up to the lower side of the upper cover layer 12.

In the method according to the invention, for example, a spacer thread 11 made from polyester with a fluorocarbon finishing can be used having a thickness of 3.0 mm, 28 stiches/cm, 8.0 stitch wales/cm according to DIN EN 14971 and 448 end wales/cm$^2$ having a compression hardness of 12.0 kPa according to DIN EN ISO 3386-1.

Then, a weakening line 30, 31 in the form of blind holes 16 is introduced into the lower side of the spacer fabric 11 by means of a laser (e.g. a UV laser, wavelength 355 nm). Such a blind hole 16 extends from the lower side through the lower cover layer 13 and substantially passes through the layer 15 having the spacer threads 14, wherein the upper cover layer 12 remains substantially undamaged.

The invention claimed is:

1. Method for producing a weakened decorative composite from at least one decorative material and a spacer fabric for producing coverings of airbags in motor vehicles, which spacer fabric has an upper cover layer and a lower cover layer, and a layer having spacer threads is located between the cover layers, characterised in that the weakenings in the spacer fabric are blind holes which are introduced into the lower cover layer of the spacer fabric, wherein the blind holes substantially pass through the lower cover layer and the layer having the spacer threads, wherein the upper cover layer is substantially not weakened, wherein the lower cover layer is knitted, wherein the spacer fabric is a three-dimensionally structured technical textile that has a defined distance between the upper cover layer and the lower cover layer, wherein the upper cover layer and the lower cover layer are bound together by a binding element, wherein the spacer threads are the binding element between the upper cover layer and the lower cover layer, and wherein the blind holes are introduced by a laser.

2. Method according to claim 1, characterised in that the blind holes are slot-shaped and the slot length of the blind holes is between 0.2 mm and 2.0 mm.

3. Method according to claim 1, characterised in that bars are between the blind holes and two weakening lines run in parallel to each other and the blind holes or bars are arranged in gaps on the two weakening lines, wherein the distance between the two weakening lines is between 0.1 mm and 2.0 mm.

4. Method according to claim 1, characterised in that the at least one decorative material is then applied to the upper cover layer of the weakened spacer fabric.

5. Method according to claim 1, characterised in that the at least one decorative material is also weakened.

6. Method for producing a weakened spacer fabric for producing coverings of airbags in motor vehicles, which spacer fabric has an upper cover layer and a lower cover layer, and a layer having spacer threads is located between the cover layers, characterised in that the weakenings in the spacer fabric are blind holes which are introduced into the lower cover layer of the spacer fabric, wherein the blind holes substantially pass through the lower cover layer and the layer having the spacer threads, wherein the upper cover layer is substantially not weakened, wherein the lower cover layer is knitted, wherein the spacer fabric is a three-dimensionally structured technical textile that has a defined distance between the upper cover layer and the lower cover layer, wherein the upper cover layer and the lower cover layer are bound together by a binding element, wherein the spacer threads are the binding element between the upper cover layer and the lower cover layer, and wherein the blind holes are introduced by a laser.

7. Method according to claim 6, characterised in that the blind holes are slot-shaped and the slot length of the blind holes is between 0.2 mm and 2.0 mm.

8. Method according to claim 6, characterised in that the blind holes are slot-shaped and the slot length of the blind holes is between 0.3 mm and 1.0 mm.

9. Method according to claim 6, characterised in that the blind holes are slot-shaped and the slot length of the blind holes is between 0.5 mm and 0.8 mm.

10. Method according to claim 6, characterised in that the blind holes are arranged on at least one weakening line.

11. Method according to claim 6, characterised in that bars are between the blind holes, the length of said bars being between 0.2 mm and 1.0 mm.

12. Method according to claim 6, characterised in that bars are between the blind holes, the length of said bars being between 0.3 mm and 0.8 mm.

13. Method according to claim 6, characterised in that bars are between the blind holes, the length of said bars being between 0.4 mm and 0.6 mm.

14. Method according to claim 6, characterised in that bars are between the blind holes and two weakening lines run in parallel to each other and the blind holes or bars are arranged in gaps on the two weakening lines.

15. Method according to claim 6, characterised in that bars are between the blind holes and two weakening lines run in parallel to each other and the blind holes or bars are arranged in gaps on the two weakening lines, wherein the distance between the two weakening lines is between 0.1 mm and 2.0 mm.

16. Method according to claim 6, characterised in that bars are between the blind holes and two weakening lines run in parallel to each other and the blind holes or bars are arranged in gaps on the two weakening lines, wherein the distance between the two weakening lines is between 0.3 mm and 1.0 mm.

17. Method according to claim 6, characterised in that bars are between the blind holes and two weakening lines run in parallel to each other and the blind holes or bars are arranged in gaps on the two weakening lines, wherein the distance between the two weakening lines is between 0.6 mm and 0.8 mm.

18. Method according to claim 6, characterised in that the blind holes are introduced into the lower cover layer of a spacer fabric laminated onto a decorative material.

* * * * *